(12) United States Patent
Jeon

(10) Patent No.: US 6,655,198 B2
(45) Date of Patent: Dec. 2, 2003

(54) LEARNING METHOD FOR AN AUTOMATIC TRANSMISSION OF A VEHICLE AND A SYSTEM THEREOF

(75) Inventor: Byeong-Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/147,680

(22) Filed: May 16, 2002

(65) Prior Publication Data

US 2003/0010104 A1 Jan. 16, 2003

(30) Foreign Application Priority Data

Jul. 11, 2001 (KR) .................................. 10-2001-41595

(51) Int. Cl.$^7$ ............................................. G01M 15/00
(52) U.S. Cl. ...................................... 73/118.1; 73/118.1
(58) Field of Search ......................... 73/118.1, 862.321, 73/862.29, 49.7; 477/90, 92, 107, 110, 143, 150; 701/29, 114

(56) References Cited

U.S. PATENT DOCUMENTS 5,609,547 A * 3/1997 Matsushita et al. ......... 477/110
5,976,057 A * 11/1999 Mori ........................... 477/150

* cited by examiner

Primary Examiner—Kamand Cuneo
Assistant Examiner—Monica D. Harrison
(74) Attorney, Agent, or Firm—Pennie & Edmonds LLP

(57) ABSTRACT

In order to enable a more rapid shift and to prevent tie-up from occurring when a down-shift occurs during an up-shift, an amount of overrun produced during the down-shift is detected, and a hydraulic duty for an engaging element of the down-shift is modified by performing one of adding and subtracting a correction value, the correction value being calculated based on the detected amount of overrun, such that the amount of overrun will converge to a predetermined minimal level.

14 Claims, 3 Drawing Sheets

LEARNING METHOD FOR AN AUTOMATIC TRANSMISSION OF A VEHICLE AND A SYSTEM THEREOF

FIELD OF THE INVENTION

The present invention relates to a learning method for an automatic transmission of a vehicle and a system thereof, and more particularly, to a learning method and system for an automatic transmission of a vehicle when a down-shift is performed during an up-shift.

BACKGROUND OF THE INVENTION

A vehicle automatic transmission performs shifting to a target shift-speed by controlling a plurality of solenoid valves that in turn control hydraulic pressure based on a variety of factors related to vehicle driving, such as a vehicle speed and throttle valve open-angle. For instance, when a driver trans-positions a select lever into a desired shift range, a manual valve transforms its port configuration, and therefore hydraulic pressure from a hydraulic pump is delivered to corresponding friction elements under control of the solenoid valves.

In the process of controlling shifting of the shift-speed, there is an element to be released, which is originally engaged, and there is also an element to be engaged (referred to as "engaging element" hereinafter), which is originally disengaged. The timing for engaging and disengaging elements to be engaged and disengaged is important to enhance shift quality in an automatic transmission, therefore, much of the recent progress in shift control methods relates to providing proper engaging and disengaging timing of friction elements. The engaging and disengaging timing can be modulated by control of hydraulic pressure supplied to the friction element, and the hydraulic pressure is controlled by a hydraulic duty applied to the solenoid valves.

When the driver releases the accelerator pedal, a transmission control unit (referred to as "TCU" hereinafter) determines that a higher shift-speed is preferable, and accordingly an up-shift of the automatic transmission will occur, which is called a lift-foot-up shift. For example, when the accelerator pedal is released while the vehicle is being driven in a third shift-speed, with the select lever being disposed in a drive "D" range, the TCU starts a shift from the third shift-speed to a fourth shift-speed. However, if the accelerator pedal is depressed again before the up-shift is completed, the TCU must perform a down-shift to either the third shift-speed or a lower one.

When a down-shift is necessary when an up-shift has not been completed, the prior art usually performs the down-shift only after the up-shift is completed. This lengthens the period of time elapsed for shifting and therefore deteriorates acceleration of the vehicle. Further, even when the prior art starts a down-shift control while the up-shift is not complete, the prior art does not provide an appropriate learning method for the down-shift. This causes shift shock during the down-shift when clearance of the clutch has changed-due to abrasion or because of tolerance stack-up, and therefore deteriorates the durability of the automatic transmission.

SUMMARY OF THE INVENTION

The present invention provides a method and a system for learning a hydraulic duty for an engaging element of a down-shift, based on an amount of overrun incurred in the down-shift such that a minimal overrun is induced in the down-shift because of the learned hydraulic duty.

A learning system for an automatic transmission according to an embodiment of the invention comprises a revolution speed detector detecting at least one of engine revolution speed and turbine revolution speed; and a transmission control unit, wherein the transmission control unit performs a learning method according to the present invention.

A learning method for an automatic transmission according to a further embodiment of the invention comprises detecting an amount of overrun produced during a down-shift occurring in an up-shift; determining whether the amount of overrun is greater than a predetermined level; and modifying a hydraulic duty for an engaging element of the down-shift on the basis of the amount of overrun and a determination in whether the amount of overrun is greater than a predetermined level.

Preferably, modifying a hydraulic duty comprises performing one of adding or subtracting a correction value to the hydraulic duty, the correction value being calculated based on the amount of overrun. The correction value may be calculated as increasing as the difference between a amount of overrun and the predetermined level increases. More preferably, the correction value is added to the hydraulic duty when the amount of overrun is greater than the predetermined level, and subtracted from the hydraulic duty when the amount of overrun is less than the predetermined level. The predetermined level is preferably defined as a least amount of overrun such that a tie-up shock is not incurred.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
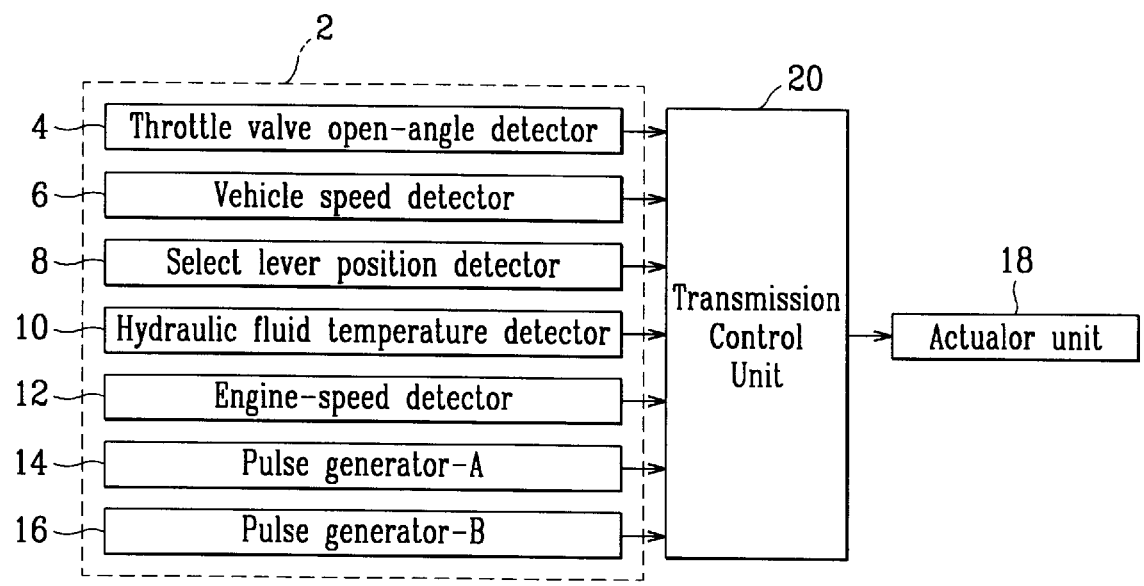
FIG. 1 is a block diagram of a learning system for an automatic transmission of a vehicle according to a preferred embodiment of the present invention.

As shown in FIG. 1, the learning system according to the embodiment of this invention includes a vehicle driving-state detecting unit 2 for detecting a plurality of factors related to the vehicle driving-state, a transmission control unit (referred to as "TCU" hereinafter) 20 for controlling a speed-shift based on the factors detected by the vehicle driving-state detecting unit 2, and an actuator unit 18 for performing the speed-shift under the control of the TCU 20. TCU 20 may include a memory and CPU as generally known in the art such that it may be programmed to contain and execute instructions for controlling actuator unit 18 according to the present invention as described herein.

The vehicle driving-state detecting unit 2 includes a throttle valve open-angle detector 4, a vehicle speed detector 6, a select lever position detector 8, a hydraulic fluid temperature detector 10, an engine-speed detector 12, and pulse generators-A 14 and -B 16.

The throttle valve open-angle detector 4 detects an open-angle of a throttle valve, the select lever position detector 8 detects the position of a select lever such as neutral "N", drive "D", second "2", and low "L" ranges. The pulse generators 14 and 16 respectively detect a turbine-speed of a turbine disposed in a torque converter of the automatic transmission, and a revolution speed of-an output-shaft of the automatic transmission.

The actuator unit 18, preferably disposed in the automatic transmission, includes a solenoid valve for controlling hydraulic pressure for a shift, and the TCU 20 controls shifting by sending a hydraulic duty signal to the solenoid valve.

Figure 2:
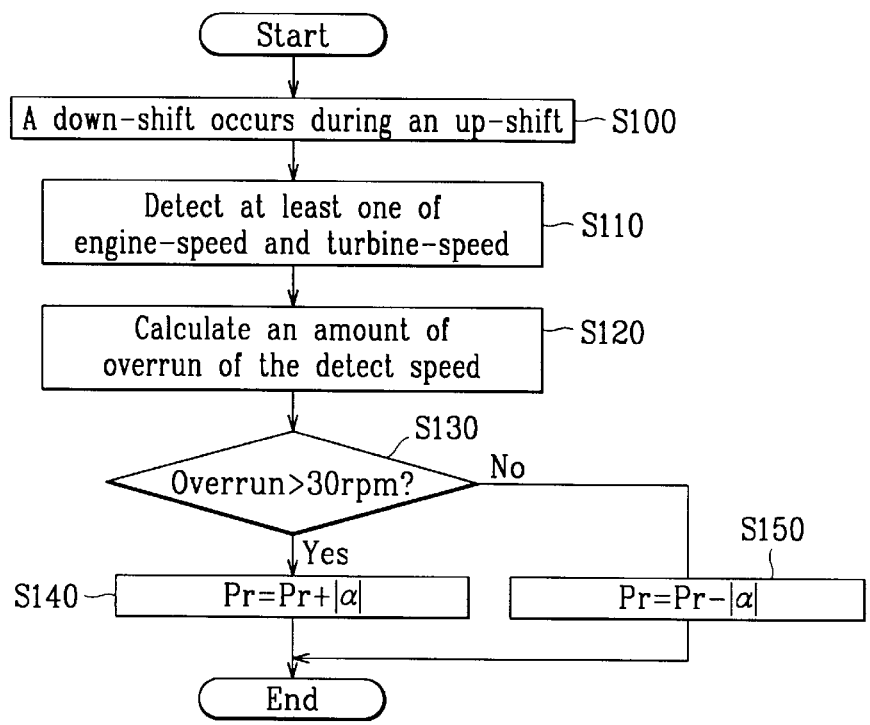
FIG. 2 is a flowchart showing a learning method for an automatic transmission of a vehicle according to a preferred embodiment of the present invention.

FIG. 2 illustrates how the hydraulic duty is learned by the TCU 20. When a down-shift occurs during an up-shift at step S100, the TCU 20 detects the revolution speed of the engine, or more preferably, the revolution speed of the transmission turbine at step S110. The TCU 20 then calculates an amount of overrun, produced during the down-shift, at the detected revolution speed at step S120. Accordingly, the TCU 20 determines whether the amount of overrun is larger than a predetermined level, for example, 30 rpm, at step S130. When the amount of overrun is determined to be larger than 30 rpm at step S130, the TCU 20 calculates a correction value $|\alpha|$ of the hydraulic duty Pr, and adds the correction value $|\alpha|$ to the current hydraulic duty Pr at step S140.

When the amount of overrun is determined not to be larger than 30 rpm at step S130, the TCU 20 calculates a correction value $|\alpha|$ of the hydraulic duty Pr, and subtracts the correction value $|\alpha|$ from the current hydraulic duty Pr at step S150.

Figure 3:
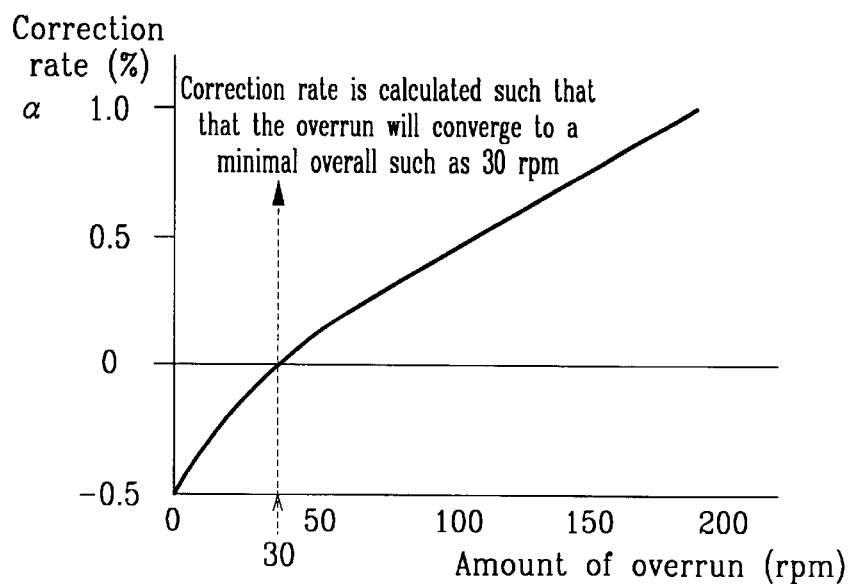
FIG. 3 is a graph showing how a correction rate of a correction value is dependent on the amount of overrun according to a preferred embodiment of the present invention.

The hydraulic duty Pr is a hydraulic duty for controlling hydraulic pressure supplied to an engaging element of the down-shift. If the correcting steps S140 and S150 are initially performed, current hydraulic duty Pr will be the same as an originally set value. The hydraulic duty Pr corrected at either step of S140 and S150 is used for a hydraulic duty for controlling a next down-shift. The correction value $|\alpha|$ depends on how much overrun has been detected at step S110, and FIG. 3 shows the dependency. As shown in FIG. 3, an exemplary correction rate for the correction value $|\alpha|$ increases as a difference between the amount of overrun and the predetermined level increases. As learning steps S100–S150 are performed repeatedly, the amount of overrun will converge to the predetermined level of 30 rpm, because the hydraulic duty Pr is repeatedly learned. The actual correction value and correction rate will vary based on size or capacity of the engine or transmission as determined by a person of ordinary skill in the art in view of the teachings of the present invention. Preferably, the predetermined overrun speed (30 rpm in the example above) can be set based on the measured output torque profile of the transmission. Larger values, such as 50 or 100 rpm, may be selected, but factors such as a lower pressure to secure an improved shift feel must be balanced with the unacceptability of large overrun speeds. For these reasons, smaller predetermined overruns speeds are generally preferred; however, a person skilled in the art may calibrate this value in the event that the transmission torque profile is unacceptable, i.e., an undesirable level of shift shock occurs.

For example, using the correction rate as illustrated in FIG. 3, at an overrun of about 200 rpm, the correction value $|\alpha|$ is about 1%. Adjusting the duty control by +1% as in step s140 may lead to a reduced overrun of about 80 rpm in a particularly sized engine. In this case, in a second iteration, a correction value of about 0.3% would be added to approach convergence with the predetermined overrun value of 30 rpm. In the event that the overrun correction caused a reduction in overrun to under 30 rpm, for example to 20 rpm, then a value of about −0.1% would be added in step s150 to approach convergence.

Figure 4:
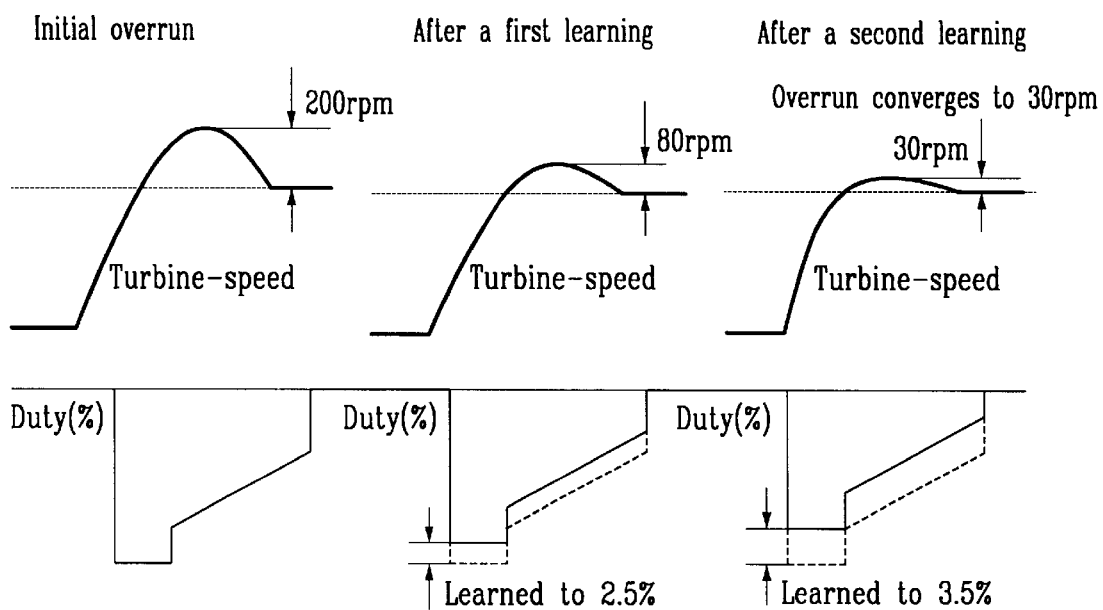
FIG. 4 is a graph showing how an overrun of a down-shift is reduced as a learning process is multiply-performed, according to a preferred embodiment of the present invention.

A further example, with a different capacity transmission or engine is illustrated in FIG. 4. In this example, when the amount of overrun is initially about 200 rpm, hydraulic duty is corrected by +2.5% and resultantly the amount of overrun is reduced to 80 rpm in a second performance of a down-shift. During the second performance of the down-shift, the hydraulic duty is learned still more, by an additional 1.0%, such that the hydraulic duty is corrected by a total of 3.5%. Resultantly, the amount of overrun is reduced to near the predetermined level, 30 rpm.

Even if no overrun is detected at step S110, the hydraulic duty Pr is learned such that eventually the amount of overrun will converge to the predetermined level, which decreases the possibility of tie-up of the transmission, and reduces shift-shock.

As shown above, this invention enables a more rapid shift and prevents a tie-up because a hydraulic duty for an engaging element in a down-shift is learned on the basis of an overrun, which enhances shift-feel and increases durability of an automatic transmission of a vehicle.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A learning method for an automatic transmission of a vehicle, comprising:
   detecting an amount of overrun produced during a down-shift occurring during execution of an up-shift;
   determining whether said amount of overrun is greater than a predetermined level; and
   modifying a hydraulic duty for an engaging element of the down-shift on the basis of said amount of overrun and the determination of whether said amount of overrun is greater than a predetermined level.

2. The learning method of claim 1, wherein said modifying hydraulic duty modifies said hydraulic duty by performing one of adding and subtracting a correction value, said correction value being calculated based on said amount of overrun.

3. The learning method of claim 2, wherein said correction value increases as a difference between said amount of overrun and said predetermined level increases.

4. The learning method of claim 2, wherein said modifying hydraulic duty comprises addition of said correction value to said hydraulic duty when said amount of overrun is greater than said predetermined level, and subtraction of said correction value from said hydraulic duty when said amount of overrun is less than said predetermined level.

5. The learning method of claim 1, wherein said predetermined level is selected based on transmission capacity to provide a minimum overrun at which shift shock is at least substantially eliminated.

6. The learning method of claim 1, wherein said predetermined overrun value is selected based upon a target gear and speed of the vehicle.

7. A learning system for an automatic transmission of a vehicle, comprising:
- a revolution speed detector detecting at least one of engine revolution speed and turbine revolution speed; and
- a transmission control unit communicating with said speed detector, wherein said transmission control unit includes instructions for:
    - detecting an amount of overrun produced during a down-shift occurring in an up-shift;
    - determining whether said amount of overrun is greater than a predetermined level; and
    - modifying a hydraulic duty for an engaging element of the down-shift on the basis of said amount of overrun and determination of whether said amount of overrun is greater than a predetermined level.

8. The learning system of claim 7, wherein said instructions for modifying hydraulic duty comprise instructions for performing one of adding and subtracting a correction value to the hydraulic duty, said correction value being calculated based on said amount of overrun.

9. The learning system of claim 8, wherein said correction value increases as a difference between said amount of overrun and said predetermined level increases.

10. The learning system of claim 8, wherein said modifying hydraulic duty comprises addition of said correction value to said hydraulic duty when said amount of overrun is greater than said predetermined level, and subtraction of said correction value from said hydraulic duty when said amount of overrun is less than said predetermined level.

11. The learning system of claim 7, wherein said predetermined level is selected based on capacity to provide a minimum at which shift shock is at least substantially eliminated.

12. The learning system of claim 7, further comprising a transmission actuating unit communicating with said control unit, wherein said control unit provides control signals to the actuating unit based on execution of said instructions.

13. The learning system of claim 12, further comprising a throttle valve open detector and a transmission select lever position detector communicating with said control unit and providing signals thereto.

14. The learning system of claim 7, wherein said predetermined overrun value is selected based upon a target gear and speed of the vehicle.

\* \* \* \* \*